US010719052B2

United States Patent
Liu et al.

(10) Patent No.: US 10,719,052 B2
(45) Date of Patent: Jul. 21, 2020

(54) LARGE-SIZE BIONIC HOLOGRAPHIC THREE-DIMENSIONAL DYNAMIC DISPLAY METHOD WITH LARGE FIELD OF VIEW

(71) Applicant: BEIJING INSTITUTE OF TECHNOLOGY, Beijing (CN)

(72) Inventors: Juan Liu, Beijing (CN); Xinhui Duan, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 231 days.

(21) Appl. No.: 15/822,107

(22) Filed: Nov. 24, 2017

(65) Prior Publication Data

US 2018/0150028 A1 May 31, 2018

(30) Foreign Application Priority Data

Nov. 25, 2016 (CN) .......................... 2016 1 1057226

(51) Int. Cl.
*G03H 1/22* (2006.01)
*G02B 27/42* (2006.01)
*G02B 30/27* (2020.01)

(52) U.S. Cl.
CPC ....... *G03H 1/2205* (2013.01); *G02B 27/4205* (2013.01); *G02B 30/27* (2020.01); *G03H 1/2249* (2013.01); *G03H 2001/226* (2013.01); *G03H 2001/2239* (2013.01); *G03H 2223/17* (2013.01); *G03H 2223/19* (2013.01); *G03H 2223/23* (2013.01); *G03H 2225/55* (2013.01)

(58) Field of Classification Search
CPC ............ G02B 23/12–125; G02B 27/01; G02B 27/0101; G02B 2027/0123; G02B 2027/0125; G02B 2027/0127; G02B 2027/013
See application file for complete search history.

(56) References Cited

U.S. PATENT DOCUMENTS

| 2013/0286053 A1* | 10/2013 | Fleck | G09G 3/3208 345/690 |
| 2014/0043320 A1* | 2/2014 | Tosaya | G02B 27/0172 345/419 |
| 2017/0255020 A1* | 9/2017 | Tam | G02B 27/0172 |

\* cited by examiner

*Primary Examiner* — Robert E. Tallman
(74) *Attorney, Agent, or Firm* — Wayne & Ken, LLC; Tony Hom

(57) ABSTRACT

The present invention relates to a large-size bionic holographic three-dimensional dynamic display method with large field of view. The method includes: a computer generated hologram (CGH) is loaded on a spatial light modulator; a large field angle is formed by changing the optical path through a microlens array or a diffractive optical element having same optical property with the microlens array disposed on a light-emitting surface of pixel structure of the spatial light modulator. Each microlens of the microlens array has one-to-one correspondence with each pixel of the pixel structure of the spatial light modulator. The cost is saved and design of the system structure is simplified while field view of the three-dimensional holographic display is expanded and large size is reappeared. The pixels in the spatial light modulator are fully utilized to avoid loss of resolution, and the display precision is provided to meet the growing demand of people.

9 Claims, 6 Drawing Sheets

LARGE-SIZE BIONIC HOLOGRAPHIC THREE-DIMENSIONAL DYNAMIC DISPLAY METHOD WITH LARGE FIELD OF VIEW

FIELD OF THE INVENTION

The present invention relates to technical field of three-dimensional dynamic display, and more specifically, to a large-size bionic holographic three-dimensional dynamic display method with large field of view.

BACKGROUND OF THE INVENTION

The spatial light modulator is a device for rebuilding three-dimensional objects by loading hologram and is the core part of dynamic holographic 3D display. Therefore, the level of the spatial light modulator determines the reproduction effects such as reproducing image size, resolution ratio, the field angle etc. The bandwidth product of the spatial light modulator can be approximated as the ratio of the display panel of the spatial light modulator to the minimum pixel area. Existing methods for increasing the space bandwidth product are divided into space division multiplexing and time division multiplexing. Spatial division multiplexing increases the space-bandwidth product of the system by stitching multiple spatial light modulators, while time-division multiplexing splices in time by scanning.

SUMMARY OF THE INVENTION

The present invention aims to solve the problem of complex structure and small field of view in the large-size bionic holographic three-dimensional dynamic display system with large field of view in the prior art.

In order to solve the above technical problem, the present invention provides a large-size bionic holographic three-dimensional dynamic display method with large field of view, including:

loading a real-time generated computer hologram on a spatial light modulator; and changing an optical path and forming a large field of view angle through a microlens array disposed on a light-emitting surface of a pixel structure of the spatial light modulator;

wherein each microlens of the microlens array has one-to-one correspondence with each pixel of the pixel structure of the spatial light modulator.

According to the invention, the method further comprises:

expanding and collimating by utilizing coherent light source or partially coherent light source; obtaining required wave-front, of optical wave and light-emitting the obtained light wave-front on the spatial light modulator when loading the real-time generated computer hologram on the spatial light modulator.

According to the invention, a focal length of each microlens in the microlens array is equal to a distance between the microlens and the spatial light modulator.

According to the invention, the microlens array is located in a plane parallel to the pixel structure.

According to the invention, the microlens array forms a parabolic structure protruding away from the pixel structure.

According to the invention, the microlens array forms a parabolic structure protruding towards one side close to the pixel structure.

According to the invention, the method comprises:

loading a real-time generated computer hologram on a spatial light modulator; and changing an optical path through a diffractive optical element on a light-emitting direction of the spatial light modulator and forming a large field of view angle;

wherein the diffractive optical element has a same optical property with a microlens array.

The above technical solution of the present invention has the following advantages over the prior art: the embodiments of the present invention provide a large-size bionic holographic three-dimensional dynamic display method with large field of view, the field angle is enlarged by changing the light path through microlens array provided on the light-emitting surface of the pixel structure of the spatial light modulator, the view angle of 3D holographic display is expanded while the coat is saved and the design of system structure is simplified, and the large scale is reappeared. And due to the optimization of the system structure, the pixels on the spatial light modulator can be fully utilized to avoid loss of resolution, and higher display precision is provided to meet the growing demand of people.

In figures: 1—spatial light modulator; 2—pixel; 3—microlens array; 4—diffractive optical element.

DETAILED DESCRIPTION OF THE INVENTION

To make the objectives, technical solutions, and advantages of the embodiments of the present invention more comprehensible, the technical solutions in the embodiments of the present invention are clearly and completely described in the following in accompanying with the drawings in the embodiments of the present invention. Apparently, embodiments described herewith are merely a part but not all of the embodiments of the present invention. Other embodiments obtained by a person of ordinary skill in the art based on the embodiments of the present invention without creative efforts shall fall within the protection scope of the present invention.

Figure 1:
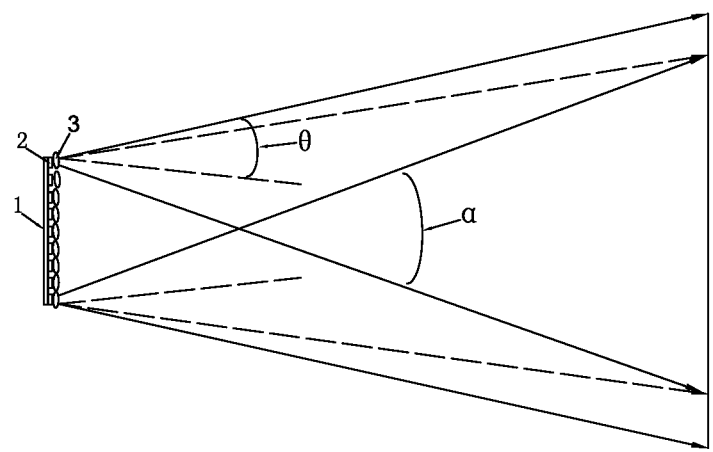
FIG. 1 is a light path schematic view of embodiment 1 of the present invention.

As shown in FIG. 1, a large-size bionic holographic three-dimensional dynamic display method with large field of view provided in an embodiment of the present invention includes the following steps:

the real-time generated computer hologram is loaded on a spatial light modulator 1;

a large field angle is formed by changing the optical path through a microlens array 3 on an light-emitting surface of pixel structure of the spatial light modulator 1; each microlens of the microlens array 3 has one-to-one correspondence with each pixel 2 of the pixel structure of the spatial light modulator 1. Preferably, the focal length of each microlens in the microlens array 3 in this embodiment is equal to the distance between the microlens and the spatial light modulator. The setting angle of each micro-lens is specifically adjusted according to the corresponding pixel 2, so that the field angle is enlarged. The microlens array 3 can be configured like a fish-eye structure to achieve a large field angle.

Specifically, when the real-time generated hologram is loaded on the spatial light modulator 1, the coherent light source or the partially coherent light source is performed to expand the beam and the required light wavefront is collimated to illuminate the spatial light modulator 1.

The embodiment of the present invention provides a large-size bionic holographic three-dimensional dynamic display method with large field of view, field angle is enlarged by changing the light path through microlens array provided on the light-emitting surface of the pixel structure of the spatial light modulator 1, the view angle of 3D holographic display is expanded while the coat is saved and the design of system structure is simplified, and the large scale is reappeared. And due to the optimization of the system structure, the pixels on the spatial light modulator 1 are fully utilized to avoid loss of resolution, and at the same time higher display precision is provided to meet the growing demand of people.

Preferably, the microlens array 3 in this embodiment is in a plane parallel to the pixel structure. As shown in FIG. 1, after the collimated light is irradiated to the spatial light modulator 1, the microlens of the microlens array 3 corresponding to each pixel 2 diffracts the light, the maximum diffractive angle of each microlens is $\theta$, the final formed field angle is $\alpha$, $\alpha$ satisfies the formula $\alpha=2\theta=2\arctan(d/2g)$, in the formula: d is the size of pixels 2 of the spatial light modulator 1, and g is the distance between the microlens and the spatial light modulator 1. The focal length of the selected micro-lens is smaller, the distance from the spatial light modulator 1 is smaller, the field angle is larger. For example, the selected size of microlens is 0.125 mm, the focal length is 0.4 mm, the formed field angle is 17.8°. The selected size is 1 mm, the focal length is 3.3 mm, the formed field angle is 17.2°.

Embodiment 2

Figure 2:
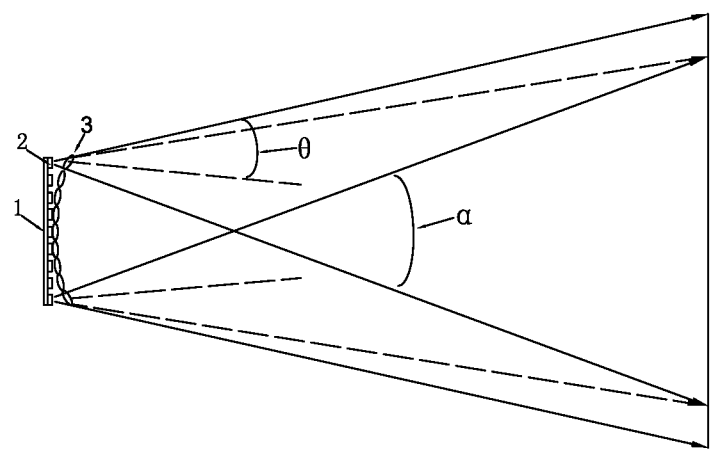
FIG. 2 is a first schematic view of the light path in embodiment 2 of the present invention.
Figure 3:
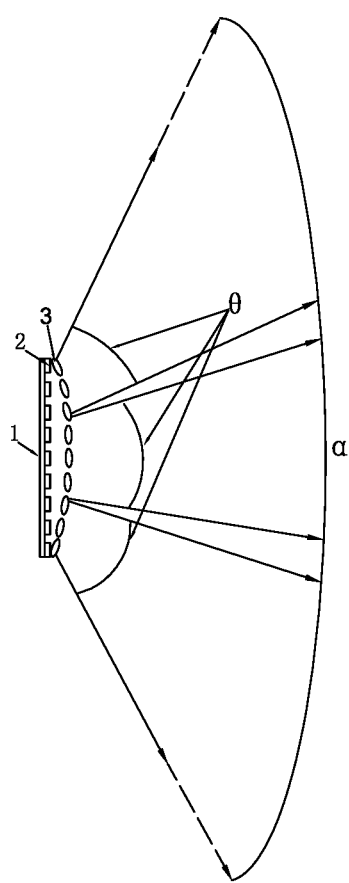
FIG. 3 is a second schematic view of the light path in embodiment 2 of the present invention.

The same technical contents of the second embodiment as the first embodiment are not described repeatedly, the disclosure of embodiment 1 also belongs to the disclosure of embodiment 2. The difference between embodiment 2 and embodiment 1 is that: the microlens array 3 in this embodiment has a curved surface structure. As shown in FIG. 2, in the first way, the microlens array 3 is formed into a parabolic structure protruding towards the side close to the pixel structure. As shown in FIG. 3, in the second way, the microlens array 3 is formed into a parabolic structure protruding towards the side away from the pixel structure. The image observed by the first way is a real image, the image observed by the second way is a virtual image. The micro-lens itself has an enlarged function to the diffractive angle of the pixels 2. The basic principle of the planar microlens array 3 and the curved microlens array 3 for enlarging the field angle is the same, both of them use the optical system to change the light transmission direction, but, in the first way, the field angle $\alpha$ and the maximum diffractive angle $\theta$ also satisfy the formula: $\alpha=2\theta=2\arctan(d/2g)$, the final field angle in the second way is determined by the field angle of each holographic element, the imaging range is less than the superposition of the field angles of all holographic units, the field angle of each hologram unit is the maximum diffractive angle corresponding to the sub-array composed of multiple pixels 2.

Embodiment 3

The embodiment of the present invention further provides a large-size bionic holographic three-dimensional dynamic display method with large field of view, the method includes the following steps:

a real-time generated computer hologram is loaded on the spatial light modulator 1;

a large field angle is formed by changing the optical path through a diffractive optical element 4, and the diffractive optical element 4 has same optical property with the microlens array 3.

In this embodiment, the diffractive optical element 4 has same optical property with the microlens array 3, both of them can enlarge the field angle. The manufacturing process of the diffractive optical element 4 determines that the different diffractive optical elements 4 have different influences on the light transmission. Specifically, in this embodiment, the diffractive optical element 4 can be fabricated by a beam wavefront of a microlens array 3 and a beam wavefront of parallel light waves to interfere, the diffractive pattern is recorded using a specific material to form the diffractive optical element 4 having the same optical characteristics with the microlens array 3.

Figure 4:
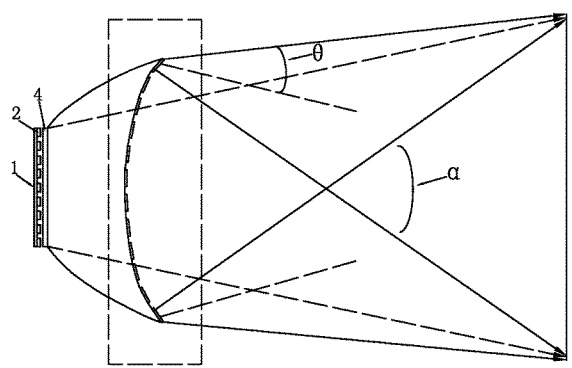
FIG. 4 is a first schematic view of the light path in embodiment 3 of the present invention.

In the present embodiment, three different schematic views of the optical path of the diffractive optical element 4 for expanding the filed angle are given specifically:

As shown in FIG. 4, the first diffractive optical element 4 enables the optical path diffracted by the diffractive optical element 4 to be a curved surface protruding towards the spatial light modulator 1. As shown in the dashed box in FIG. 4, the maximum diffractive angle of each pixel 2 is $\theta$, and the final formed field angle is $\alpha$.

Figure 5:
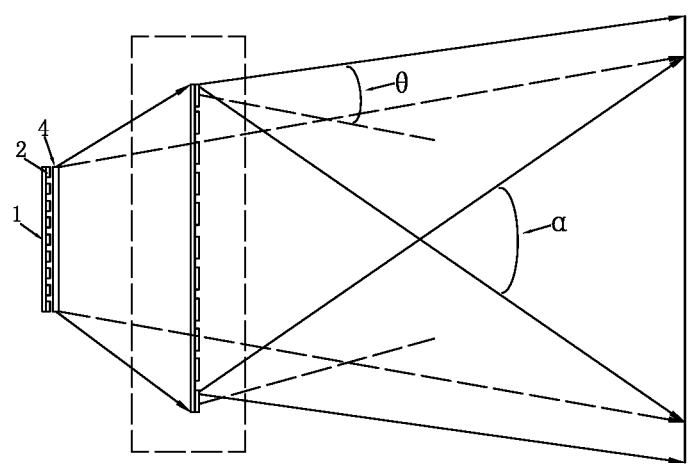
FIG. 5 is a second schematic view of the light path in embodiment 3 of the present invention.

As shown in FIG. 5, the second diffractive optical element 4 enables the optical path diffracted by the diffractive optical element 4 to be a plane. As shown in the dashed box in FIG. 5, the maximum diffractive angle corresponding to each pixel 2 is $\theta$, the final formed field angle is $\alpha$.

Figure 6:
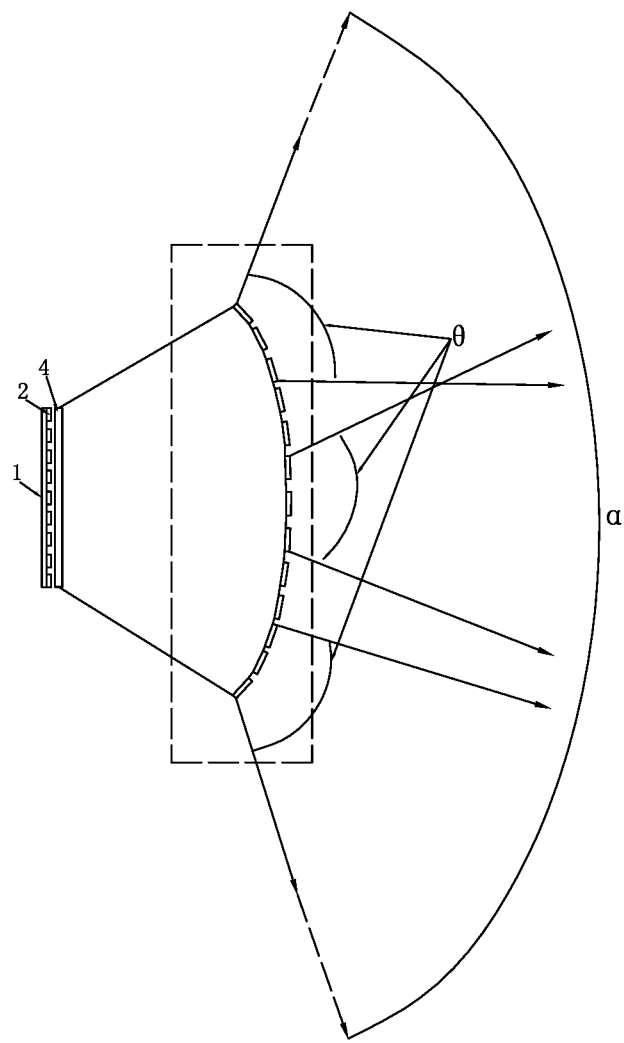
FIG. 6 is a third schematic view of the light path in embodiment 3 of the present invention.

As shown in FIG. 6, the third diffractive optical element 4 enables the optical path diffracted by the diffractive optical element 4 to be a curved surface away from the spatial light modulator 1. As shown in the dashed box in FIG. 6, the maximum diffractive angle corresponding to sub-array composed of a plurality of pixels 2 is $\theta$, the final formed field angle is $\alpha$. The sub-array composed of a plurality of pixels 2 is called a holographic unit, and the final formed field angle is determined by the field angle of each holographic unit, and the imaging range is smaller than the superposition of the field angles of all the holographic units.

Finally, it should be noted that the above embodiments are merely intended for describing the technical solutions of the present invention, but not for limiting the present invention. Although the present invention is described in detail with reference to the above embodiments, it should be understood by those skilled in the art that: modifications are made to the technical solutions described in the above embodiments or equivalent replacements are partially made to the technical features. These modifications or replacements are within the spirit and scope of the technical solutions in the embodiments of the present invention.

What is claimed is:
1. A large-size holographic three-dimensional dynamic display method with large field of view, comprising:

loading a real-time generated computer hologram on spatial light modulator; and changing an optical path and forming a large field of view angle through a microlens array disposed on a light-emitting surface of a pixel structure of the spatial light modulator;

wherein each microlens of the microlens array has one-to-one correspondence with each pixel of the pixel structure of the spatial light modulator; and each microlens of the microlens array diffracts light emission from a corresponding pixel on the light-emitting surface with a specific diffractive angle.

2. The large-size holographic three-dimensional dynamic display method with large field of view of claim 1, further comprising:

expanding and collimating by utilizing coherent light source or partially coherent light source to obtain required wave-front of optical wave and light-emitting the obtained light wave-front on the spatial light modulator when loading the real-time generated computer hologram on the spatial light modulator.

3. The large-size holographic three-dimensional dynamic display method with large field of view of claim 1, wherein a focal length of each microlens in the microlens array is equal to a distance between the microlens and the spatial light modulator.

4. The large-size holographic three-dimensional dynamic display method with large field of view of claim 1, wherein the microlens array is located in a plane parallel to the pixel structure.

5. The large-size holographic three-dimensional dynamic display method with large field of view of claim 1, wherein the microlens array forms a parabolic structure protruding away from the pixel structure.

6. The large-size holographic three-dimensional dynamic display method with large field of view of claim 1, wherein, the microlens array forms a parabolic structure protruding towards one side close to the pixel structure.

7. A large-size holographic three-dimensional dynamic display method with large field of view, comprising:

loading a real-time generated computer hologram on a spatial light modulator; and changing an optical path through a diffractive optical element on a light-emitting direction of the spatial light modulator by diffracting light emission from the spatial light modulator and forming a large field of view angle;

wherein the diffractive optical element has a same optical property with a microlens array; the diffractive optical element comprises micro-structures having one-to-one correspondence with each pixel of a pixel structure of the spatial light modulator, and each micro-structure diffracts light from a corresponding pixel of the pixel structure.

8. The large-size holographic three-dimensional dynamic display method with large field of view of claim 1, wherein a field angle in the method is a double of a maximum diffractive angle among the diffractive angles.

9. The large-size holographic three-dimensional dynamic display method with large field of view of claim 1, wherein a maximum value of the diffractive angle is $\theta=\arctan(d/2g)$, where d represents a size of the corresponding pixel and g represents a distance between the microlens and the spatial light modulator.

* * * * *